(12) United States Patent
Morooka

(10) Patent No.: US 8,564,826 B2
(45) Date of Patent: Oct. 22, 2013

(54) INFORMATION PROCESSING APPARATUS, CONTROL METHOD, AND STORAGE MEDIUM UTILIZED IN AN AUTOMATIC LAYOUT SYSTEM

(75) Inventor: Hidekazu Morooka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 518 days.

(21) Appl. No.: 12/850,448

(22) Filed: Aug. 4, 2010

(65) Prior Publication Data
US 2010/0328692 A1    Dec. 30, 2010

Related U.S. Application Data

(63) Continuation of application No. PCT/JP2009/061825, filed on Jun. 29, 2009.

(51) Int. Cl.
*G06K 15/02* (2006.01)
(52) U.S. Cl.
USPC ............. 358/1.2; 358/1.9; 358/2.1; 358/1.18; 382/175; 382/286; 382/291; 382/292; 382/293; 382/295; 382/298
(58) Field of Classification Search
USPC ........... 358/1.2, 1.9, 1.18; 382/175, 286, 291, 382/292, 298
See application file for complete search history.

(56) References Cited

U.S. PATENT DOCUMENTS 5,717,843 A * 2/1998 Tabata et al. .................. 358/1.18
7,090,631 B2 * 8/2006 Boss ............................. 493/367

FOREIGN PATENT DOCUMENTS

| JP | H06-075948 A | 3/1994 |
|---|---|---|
| JP | H06-219629 A | 8/1994 |
| JP | 2006-209427 A | 8/2006 |
| JP | 2006-211114 A | 8/2006 |
| JP | 2006-352486 A | 12/2006 |
| JP | 2006352486 A * | 12/2006 |
| JP | 2007-034444 A | 2/2007 |
| JP | 2007-041944 A | 2/2007 |

\* cited by examiner

*Primary Examiner* — King Poon
*Assistant Examiner* — Jamares Q Washington
(74) *Attorney, Agent, or Firm* — Canon USA Inc IP Division

(57) ABSTRACT

To shift an image in order to prevent the image from overlapping with a finishing position, the amount of shift for preventing the overlap may be increased and a desired result of layout may not be obtained. In addition, if the image is not shifted in order to obtain the desired result of layout, the image may overlap with the finishing position and toner or the like may come off. When it is determined that a position where the finishing process is to be executed overlaps with a content data placement area, an avoidance area where printing is not performed is placed at a position in which the position where the finishing process is to be executed overlaps with the content data placement area without changing the position and size of the content data placement area.

6 Claims, 22 Drawing Sheets

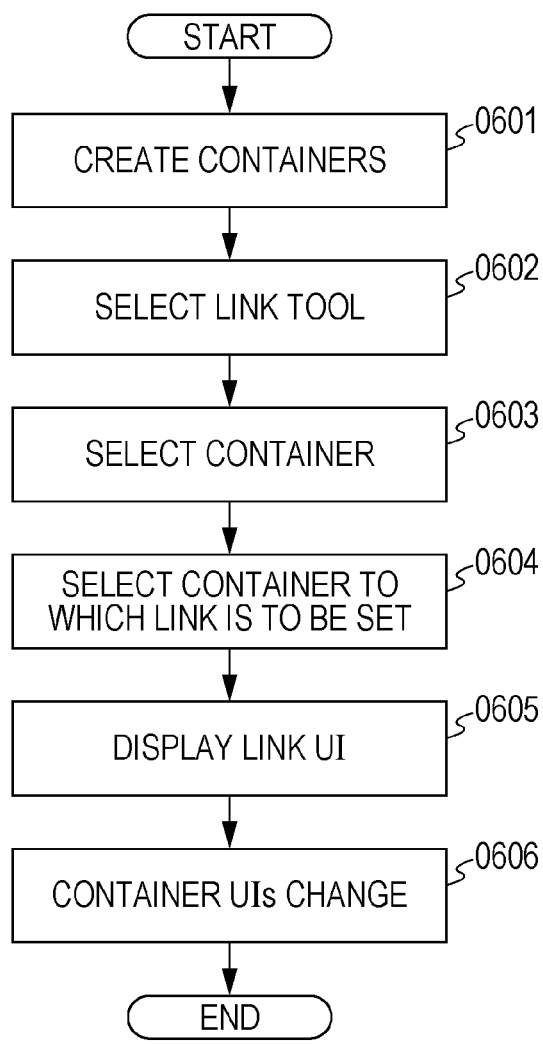

INFORMATION PROCESSING APPARATUS, CONTROL METHOD, AND STORAGE MEDIUM UTILIZED IN AN AUTOMATIC LAYOUT SYSTEM

This application is a Continuation of International Application No. PCT/JP2009/061825, filed Jun. 29, 2009, which is hereby incorporated by reference herein in its entirety.

TECHNICAL FIELD

The present invention relates to an apparatus/medium in an automatic layout system, and a printing method.

BACKGROUND ART

One-to-one marketing is a kind of database marketing and makes suggestions that meet customer needs on the basis of personal attribute information such as the age, sex, hobbies, preferences, and purchasing history of a customer. A typical method thereof is variable printing. Recently, there has been known a variable printing technique of optimally performing automatic layout of content that differs from customer to customer.

As for application of this technique to direct mail or the like, there is a use case where a printed material is produced while being subjected to a finishing process such as folding and the printed material is sent as postal matter. However, if a finishing position overlaps with content in the printed material, a problem, e.g., a reduction in legibility of a document may occur. As a technique for solving it, a technique of detecting a binding position in a sheet of paper and shifting the whole of an image when the image is located in the binding position is disclosed in Patent Literature 1.

However, when an image is shifted in order to avoid the overlap between a finishing position and content as in the related art, the amount of shift is increased in order to avoid the overlap. Disadvantageously, it may be difficult to obtain a desired result of layout.

Whereas, if the content is not shifted so that the desired result of layout is obtained, the content overlaps with a finishing position. Disadvantageously, for example, toner may come off.

Citation List

Patent Literature

PTL 1: Japanese Patent Laid-Open No. 06-219629

SUMMARY OF INVENTION

To solve the above-described problem, the present invention provides an information processing apparatus including setting means for setting a finishing process used for a sheet of paper, determining means for determining whether a position where the finishing process set by the setting means is to be executed overlaps with a content data placement area, and placing means for, when the determining means determines that the position where the finishing process is to be executed overlaps with the content data placement area, placing an avoidance area where printing is not performed at a position in which the position where the finishing process is to be executed overlaps with the content data placement area without changing the position and size of the content data placement area.

Further features of the present invention will become apparent from the following description of exemplary embodiments with reference to the attached drawings.

BRIEF DESCRIPTION OF DRAWINGS

FIG. 3 illustrates a flow of creating a link according to the present invention.

DESCRIPTION OF EMBODIMENTS

Preferred embodiments of the present invention will be described.

Prior to describing the embodiments of the present invention, the configuration of a system to which the present invention can be applied and the configuration of an application will be described.

<Diagram of System Configuration>

Figure 1:
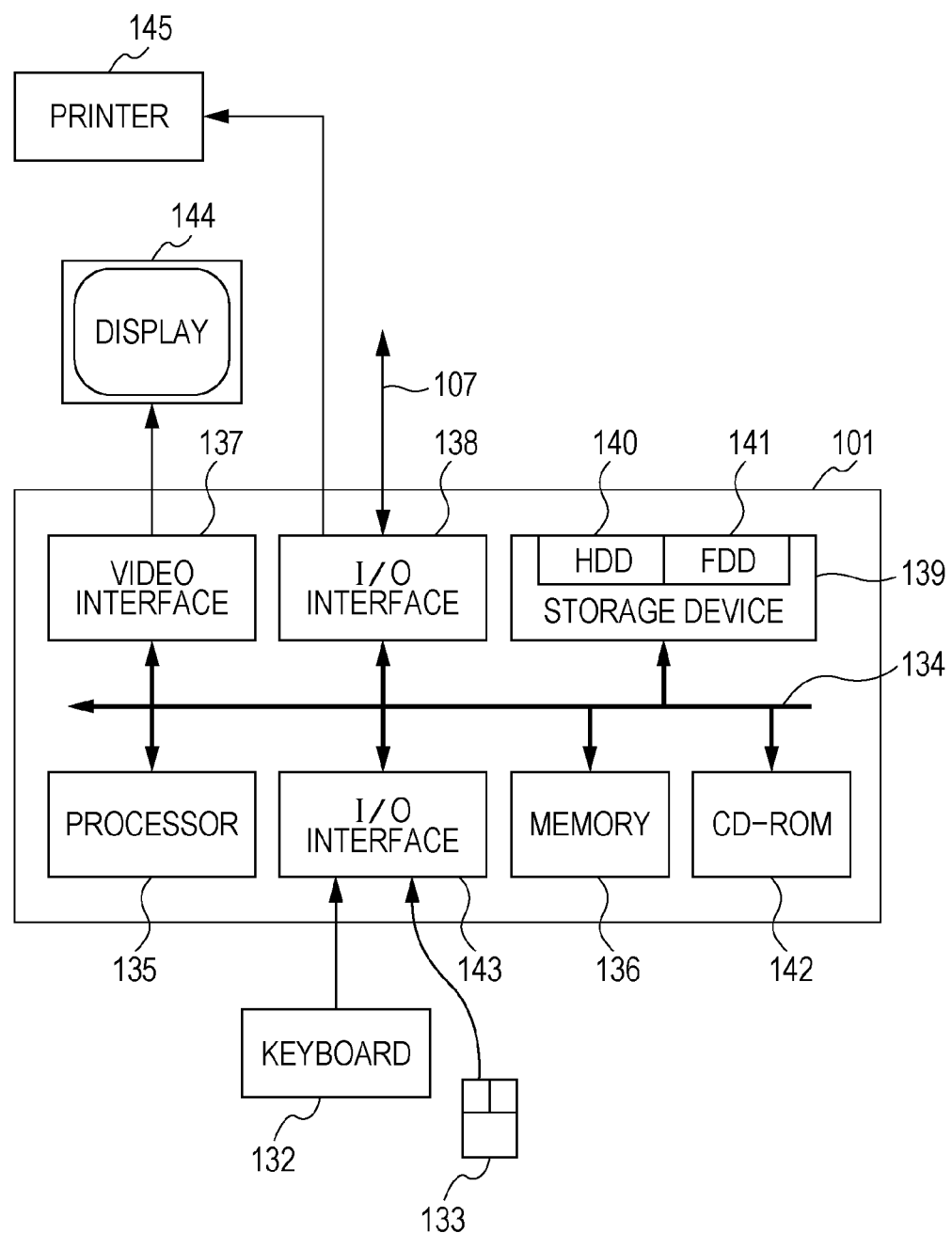
FIG. 1 illustrates a schematic diagram of a computer module.

Referring to FIG. 1, a computer (information processing apparatus) 101 is capable of communicating with an input device including a keyboard 132 and a pointing device such as a mouse 133 and an output device including a display device 144 and a printer 145.

An input/output interface 138 is an interface for connecting the computer 101 to another computer via network connection 107. A typical example of the network connection 107 is a local area network (LAN) or a wide area network (WAN).

The computer 101 includes at least one processor unit 135 and a memory unit 136 including, for example, a semiconductor random access memory (RAM) and a read only memory (ROM). The computer 101 further includes an input/output (I/O) interface including a video interface 137 and an I/O interface 143 for connecting to the keyboard 132 and the mouse 133.

A storage device 139 typically includes a hard disk drive 140 and a floppy (registered trademark) disk drive 141. Although not illustrated in the figure, a magnetic tape drive may also be used. A CD-ROM drive 142 is provided as a non-volatile data source.

The computer 101 includes an operation system such as GNU/LINUX or Microsoft Windows (registered trademark).

The above-described modules can communicate with each other through an interconnection bus 134. A layout editing application is resident in the hard disk drive 140 and is executed by the processor unit 135.

Alternatively, the layout editing application may be read through the network connection 107.

Figure 2:
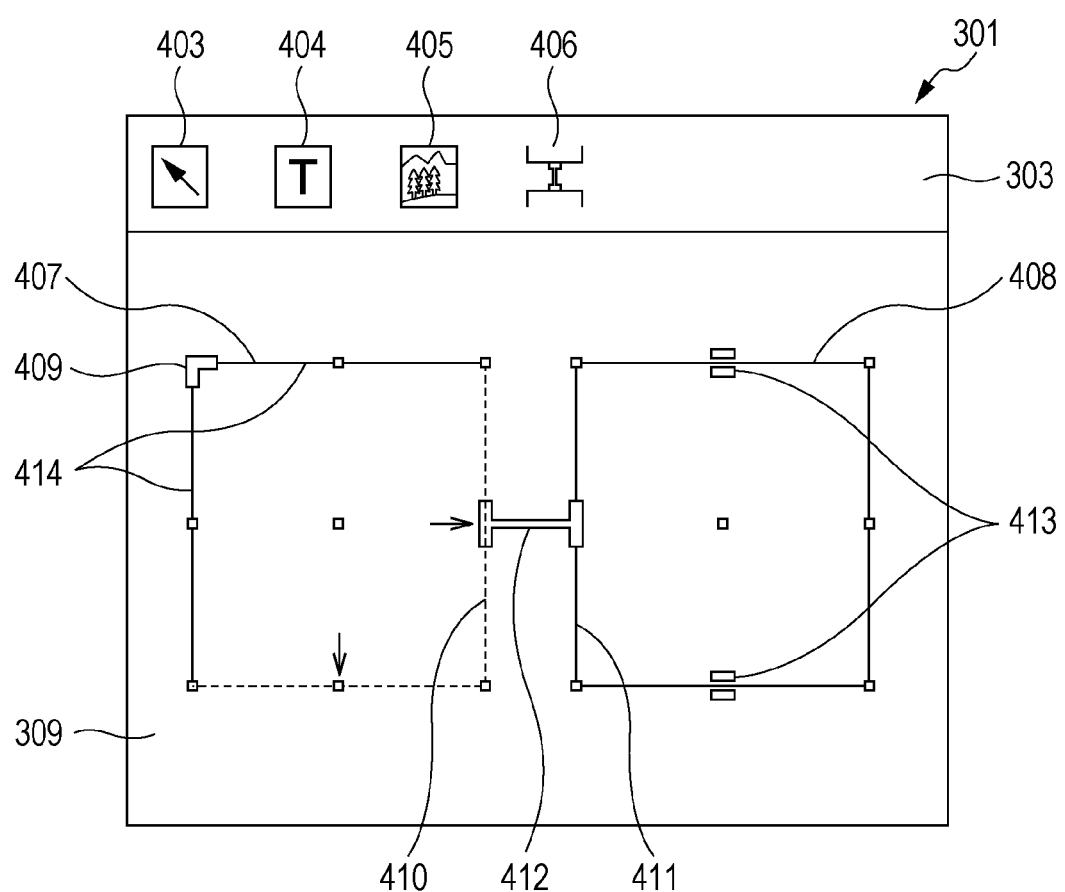
FIG. 2 illustrates a template according to the present invention.

FIG. 2 illustrates a window 301 that displays a template created by a user. A tool bar area 303 is provided with at least the following "buttons" that the user can select.

A selection tool button 403 is used to select, shift, size-change, resize, and lock/unlock a side of a container. A text container tool button 404 is used to create a container (area) to which text data is allocated.

An image container tool button 405 is used to create a container (area) to which image data is allocated.

A link tool button 406 is used to control the distance between containers.

A container means an area to which content data is allocated. Specifically, an image container is an area to which image data as content data is allocated and a text container is an area to which text data as content data is allocated.

FIG. 2 also illustrates objects which can be displayed on a document template 309 of one page. They include containers 407 and 408, an arbitrarily applicable anchor icon 409, unfixed sides 410, a link 412, and sliders 413.

A new text container or image container is created by clicking the mouse 133 on the text container tool button 404 or the image container tool 405 and dragging a rectangle onto the template 309. Alternatively, a container can be easily created by activating the appropriate tool 404 or 405 and clicking on the document template 309.

The size of a container can be varied or fixed in accordance with a user specification.

[Link Setting Method]

Figure 4A:
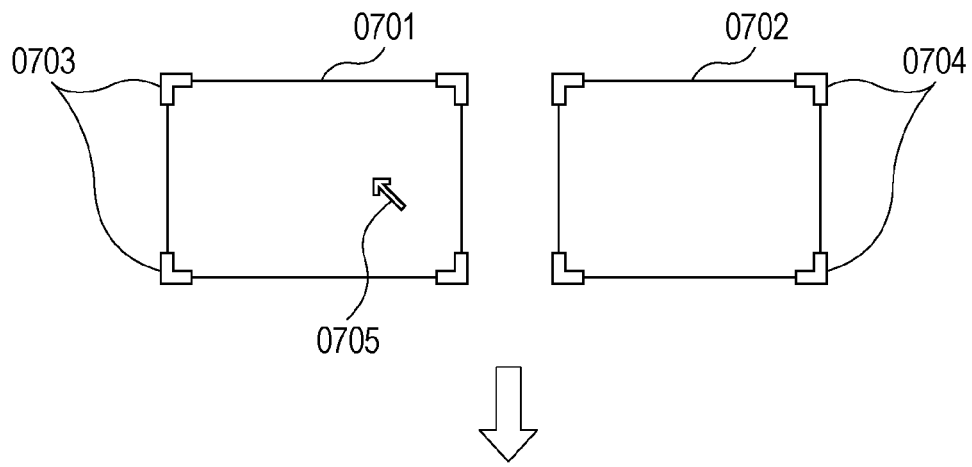
FIGS. 4A to 4C are diagrams illustrating UIs upon link creation.
Figure 4B:
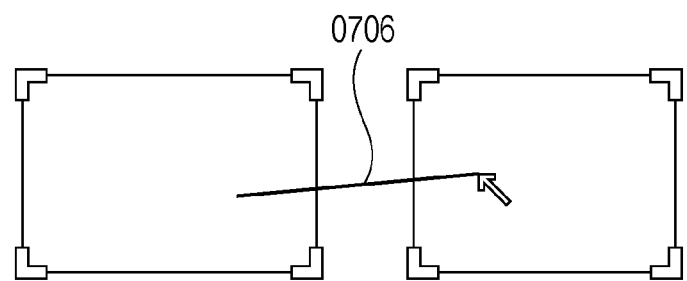
Figure 4C:
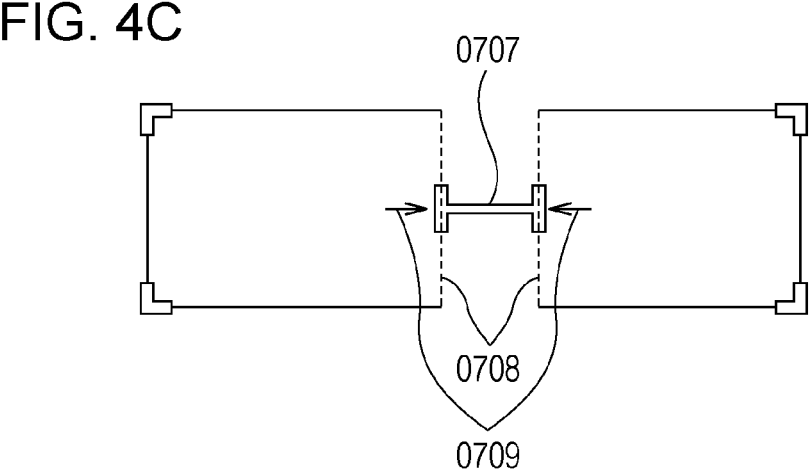

FIG. 3 is a flow diagram illustrating a link setting method. FIGS. 4A to 4C illustrate examples of a UI. A method of setting a link between containers will be described with reference to the figures. The flowchart according to the present invention is achieved by executing the layout editing application program for realizing the present invention read from the memory unit 136 through the processor unit 135.

First, the layout editing application creates (at least two) containers for link setting in accordance with a user instruction (step 0601).

Subsequently, the layout editing application allows the above-described link tool to be selected in accordance with a user instruction (step 0602). FIGS. 4A to 4C illustrate an operation of setting a link in the case where the containers are created and the link tool is selected. The operation in FIGS. 4A to 4C will be sequentially described.

FIG. 4A illustrates containers 0701 and 0702. Anchors 0703 and 0704 indicate that sides with the anchors are fixed. Reference numeral 0705 indicates a mouse pointer.

The layout editing application selects one container to which a link is to be set in accordance with a user instruction (step 0603).

As illustrated in FIG. 4B, the layout editing application selects the other container in accordance with a user instruction (step 0604). In FIG. 4B, a line 0706 connects a clicked position in FIG. 4A to the moved mouse pointer and serves as a UI that presents which position the link is to be set in to the user. After completion of processing in step 0604, the layout editing application displays a link UI 0707 in the set position (step 0605). Consequently, the containers enter a state illustrated in FIG. 4C. When the link is set, the UIs of the containers also change automatically (step 0606). Sides 0708 indicated by dashed lines are variable sides. The reason why the states of the sides of the containers are changed as illustrated in FIG. 4C is that the sides of the containers have to be changed to variable sides in accordance with link setting. If all sides are fixed even after link setting, a contradiction arises. The above-described processing is automatically performed in order to prevent the contradiction. Marks 0709 visually present the user the directions in which the containers can change due to link setting. In the case of FIG. 4C, the right side of the left container and the left side of the right container change to variable sides. This is an example.

[Layout Calculating Method (Overall Flow)]

Figure 5:
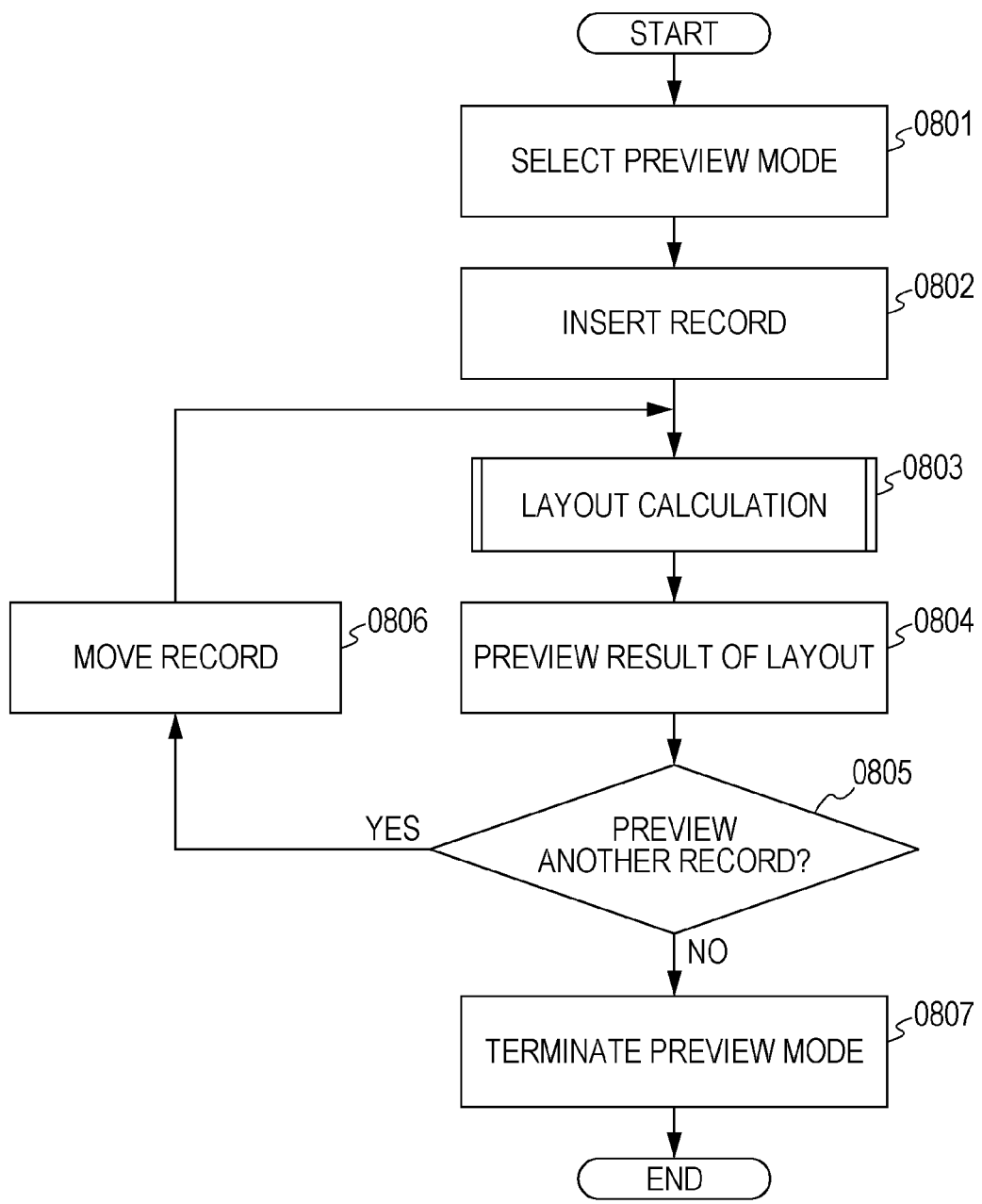
FIG. 5 illustrates an overall flow for layout calculation in the present invention.

FIG. 5 is a flow for layout calculation.

The layout editing application selects a preview mode in accordance with a user instruction (step 0801). The layout editing application has a container creation mode for creating a template and the preview mode for inserting content data of a record onto the created template and previewing the result of layout. In the preview mode, the layout editing application inserts content data of an actual record into containers on the template to calculate a layout. Note that layout calculation for display is performed in the preview mode. In actual printing, a record is inserted and a layout is calculated. The calculating method at this time is similarly performed.

In the preview mode, the layout editing application selects a record to be previewed and inserts the record (step 0802), performs layout calculation for the record (step 0803), and displays the result of layout calculated by processing in step 0803 (step 0804).

The layout editing application determines whether to preview another record (step 0805). When it is determined in processing in step 0805 that it is unnecessary to preview another record, the layout editing application terminates the preview mode (step 0807). If another record is to be previewed, the layout editing application selects another record, again performs layout calculation, and performs previewing (step 0806). During printing instead of the preview mode, layout calculation is sequentially performed for each of records to be printed. Accordingly, processings in steps 0805 and 0807 are not performed. The process terminates at the completion of printing of all of the records.

[Layout Calculating Method]

Figure 6:
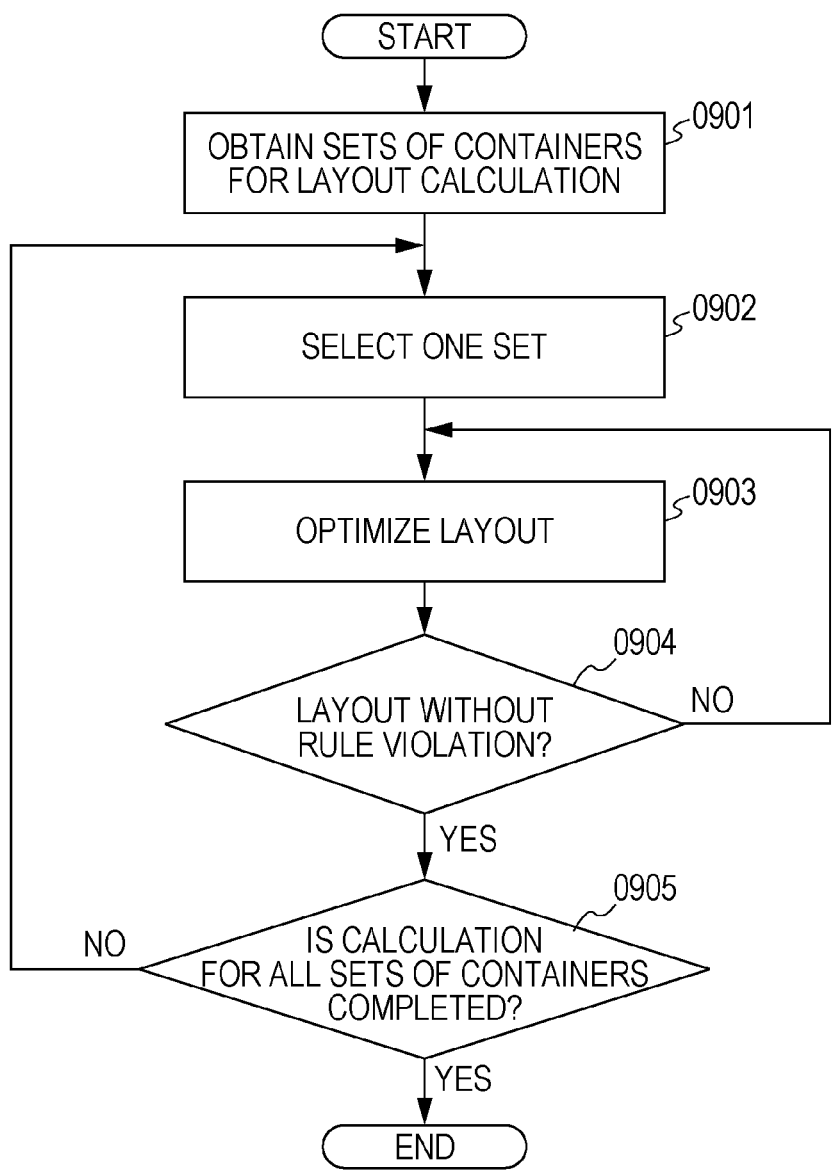
FIG. 6 illustrates a detailed flow of layout calculation in the present invention.

FIG. 6 is a flow diagram illustrating the details of layout calculation. FIG. 7 includes diagrams illustrating UIs displayed at this time.

Figure 8:
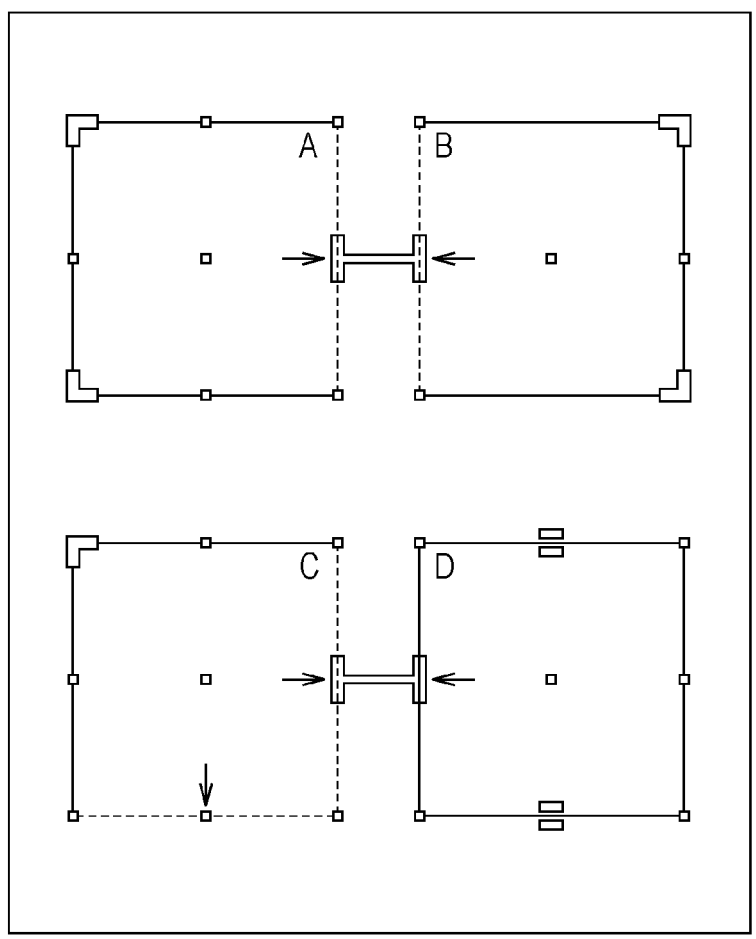
FIG. 8 illustrates an example for explanation of sets of containers in the present invention.

The layout editing application obtains sets of containers for layout calculation (step 0901). Layout calculation is performed for each set of containers associated with each other by a link. For example, referring to FIG. 8, four containers are laid out on a page such that the containers are associated. In this case, a container A is associated with a container B by a link and a container C is associated with a container D by another link. Accordingly, the containers A and B constitute a set 1 and the containers C and D constitute a set 2.

Subsequently, the layout editing application selects one set for layout calculation from the sets of containers obtained in step 0901 (step 0902). Then, the layout editing application performs layout calculation for the selected set of containers. In this case, the layout editing application optimizes a layout so as to minimize the difference between the size of each container to be laid out and that of actual content as much as possible (step 0903). To optimize the layout, the layout editing application calculates the sizes of the respective containers so that the amounts of change in size of content data items inserted into the containers associated by the link are equalized. If layout optimization is performed with rule violation, the layout editing application again performs calculation so as to prevent rule violation (step 0904). Rules described here are constrains set by the user upon layout creation and relate to, for example, the size and position of a container and the length of a link. When the layout is calculated without rule violation, the layout of the set is completed. Steps 0902 to 0904 are performed for all of the sets on the page, thus calculating the layout of the entire page (step 0905).

Figure 7A:
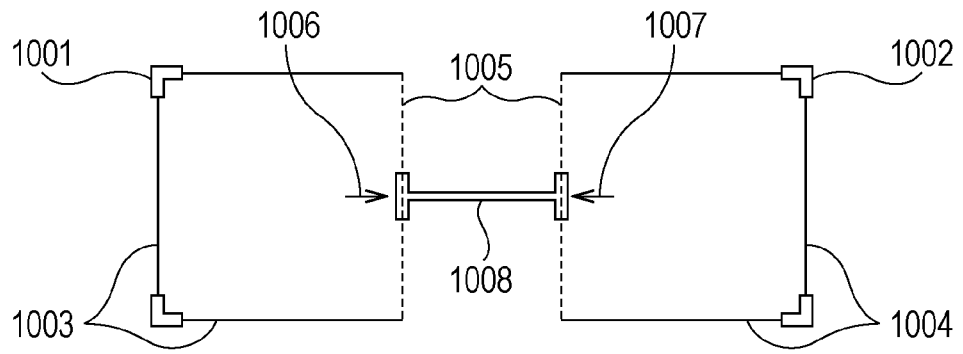
FIGS. 7A to 7C illustrate examples of UIs relevant to the flow of FIG. 6 in the present invention.
Figure 7B:
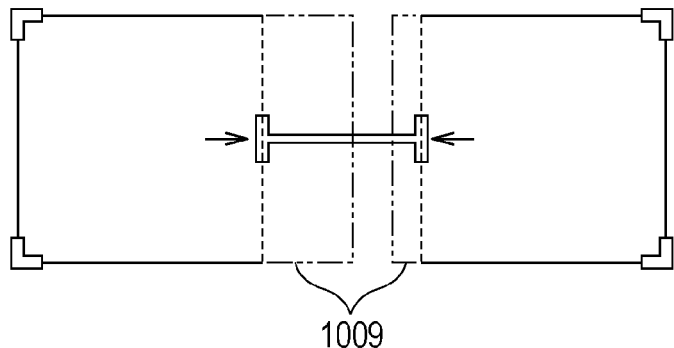
Figure 7C:
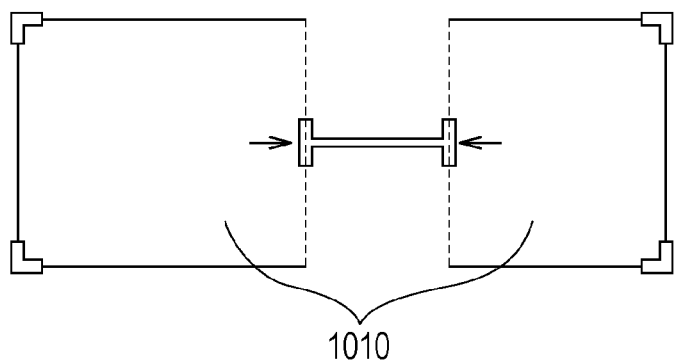

FIGS. 7A to 7C illustrate UIs during layout calculation.

FIG. 7A illustrates a state in which content data of a certain record is inserted and a layout is determined. Reference numerals 1001 and 1002 denote anchors, reference numerals 1003 and 1004 denote fixed sides, reference numeral 1005 indicates variable sides, reference numeral 1006 denotes an arrow indicating the direction in which the variable side is shifted, and reference numeral 1008 indicates a link. In this state, the record is changed and content data items having different sizes are inserted. FIG. 7B illustrates the sizes of new content data items overlapping with the items in FIG. 7A. Reference numeral 1009 indicates the sizes of the content data items inserted into the containers, respectively. Then, layout calculation is performed. FIG. 7C illustrates the result of layout calculated. The sizes of the containers are calculated so that the difference in size between the containers after calculation is equal to that between content data items actually inserted and the above-described rules are not violated. In other words, layout calculation is performed so that the amounts of change of the containers associated by the link are equalized. As illustrated in FIG. 7C, the difference in size between inserted content items (1009) illustrated in FIG. 7B is equal to that between content items (1010) after calculation.

[First Embodiment]

A first embodiment of the present invention will be described.

[Overall Flow]

Figure 9:
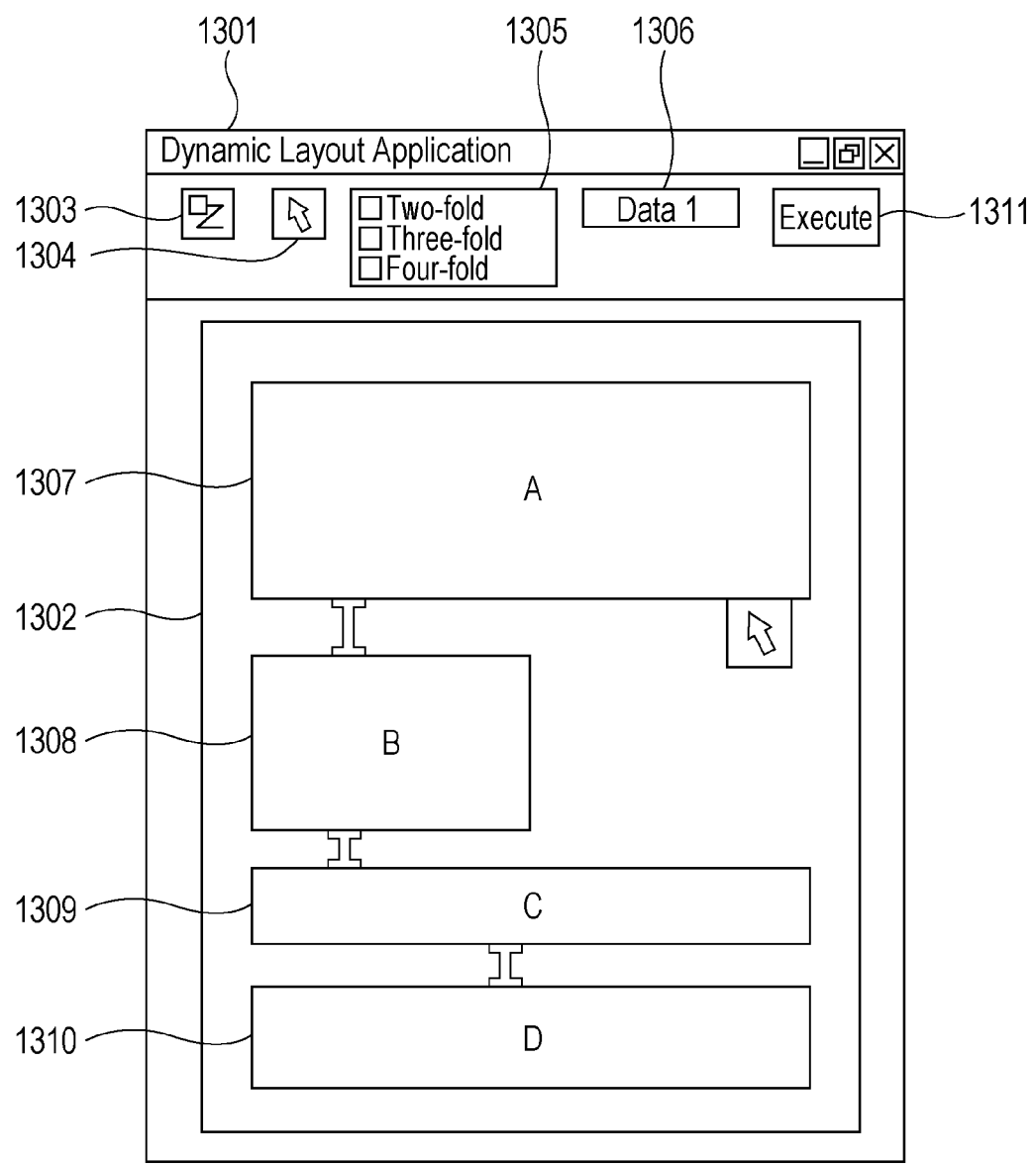
FIG. 9 illustrates a UI in the present invention.
Figure 10:
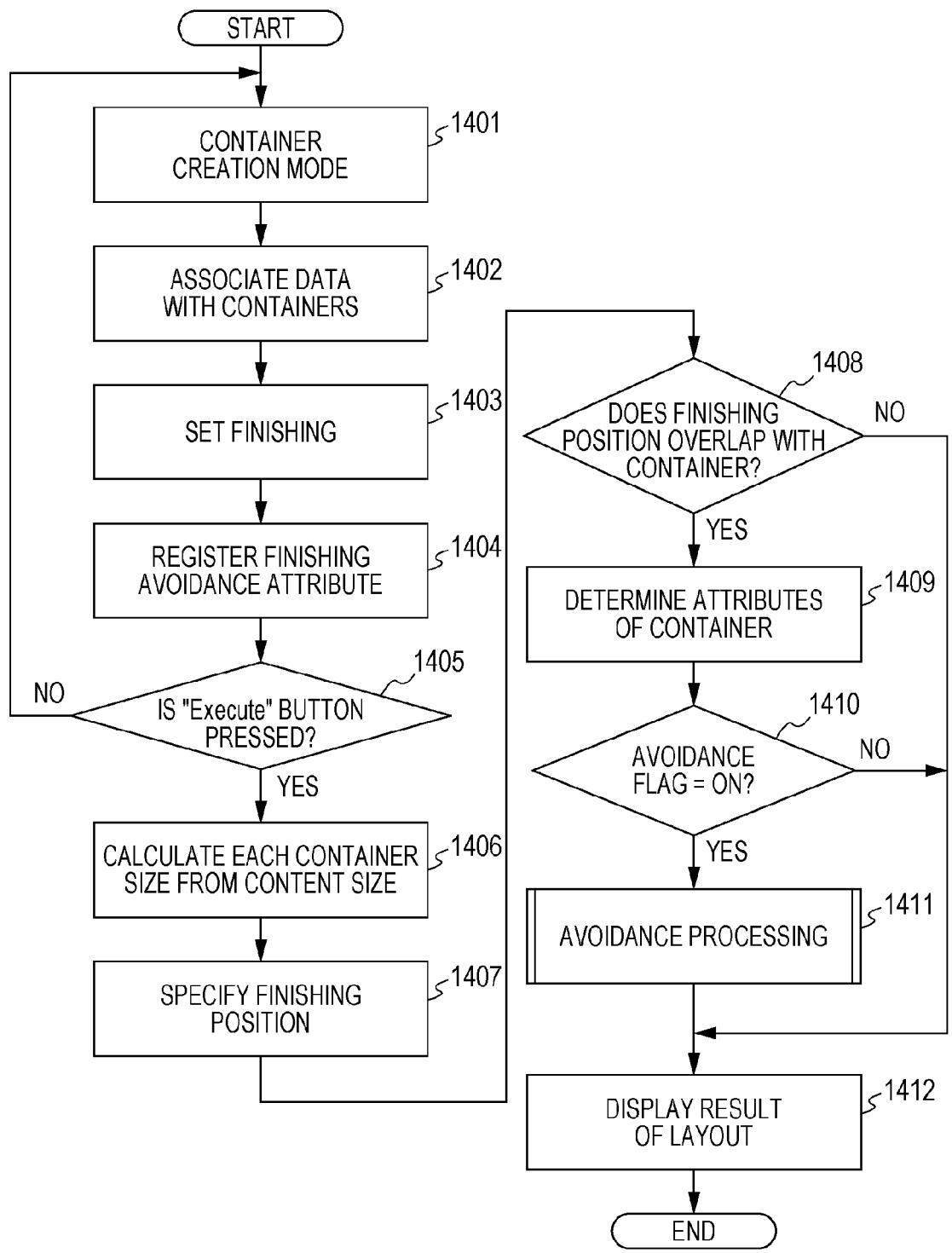
FIG. 10 illustrates an overall flow according to a first embodiment of the present invention.

FIGS. 9 and 10 illustrate an overall flow according to the present invention and a UI for explanation of the flow.

Steps of the flow of FIG. 10 will be described with reference to a UI 1301 in FIG. 9.

First, pressing an icon, indicated at 1303 in FIG. 9, allows the layout editing application to enter the container creation mode (step 1401). The layout editing application creates containers (1307 to 1310) in accordance with a user instruction.

The layout editing application associates content data 1306 with the containers (step 1402). As for the association, it is needless to say that each field information item included in data and each container may be specified and associated with each other, alternatively, a data file may be specified and information items in the file may be sequentially associated with the containers.

The layout editing application selects a finishing process, performed after the present content is laid out and printed, in accordance with an instruction 1305. The finishing process means post processing performed after printing. The present embodiment is described on the assumption that "folding" (e.g., two-fold, three-fold, or four-fold) is set as the finishing process (step 1403).

The layout editing application sets a finishing avoidance attribute to a selected container (step 1404). The finishing avoidance attribute is an attribute meaning that when the container overlaps with a finishing position, a process for avoiding the overlap is performed. After the above-described setting, the layout editing application performs layout calculation in accordance with pressing of an "Execute" button 1311 (step 1405). Since the following processing steps are internally performed, the steps will be described without contrasting with the UI.

In step 1406, the layout editing application performs the above-described processes of FIGS. 5 and 6 to calculate the size and position of each container on the basis of the content data associated in step 1402.

In step 1407, the layout editing application specifies a finishing position where the finishing process selected in step 1403 is to be performed and an adjusting range. In this case, when the layout editing application inquires the abilities to support the finishing process of the printer, processing in step 1407 is achieved. The adjusting range is a range in which the printer can shift the finishing position and is also called "amount of shift". Information indicating the abilities of the printer may be obtained via an API (SDK) provided by a printer driver of an output target or may be obtained from a device or may be read from a database that manages the abilities of the printer.

Examples of the read abilities of the printer are as follows.

Sheet size; Folding position (distance from one end of sheet); Adjusting range

Two-fold

A4 longitudinal; 148.5 mm; ±10(Y)

Three-fold

A4 longitudinal; 99.198 mm; ±5(Y)

In step 1408, the layout editing application determines, on the basis of the result of calculation in step 1406 and the finishing position specified in step 1407, whether the finishing position overlaps with a container. For example, the layout editing application compares coordinate information items indicating the sizes and positions of the containers calculated in step 1406 and coordinate information indicating the position in which finishing is to be executed to perform processing in step 1408.

When it is determined in step 1408 that the finishing position overlaps with the container, the process proceeds to step 1409.

In step 1409, the layout editing application refers to the container attributes of the container determined in step 1408 as being overlapped with the finishing process and determines whether the finishing avoidance attribute is set in the read container attributes (step 1410). If the avoidance attribute is ON, the process proceeds to step 1411. If the avoidance attribute is OFF, the process proceeds to step 1412 to display the result of layout because avoidance processing is not performed.

Figure 11:
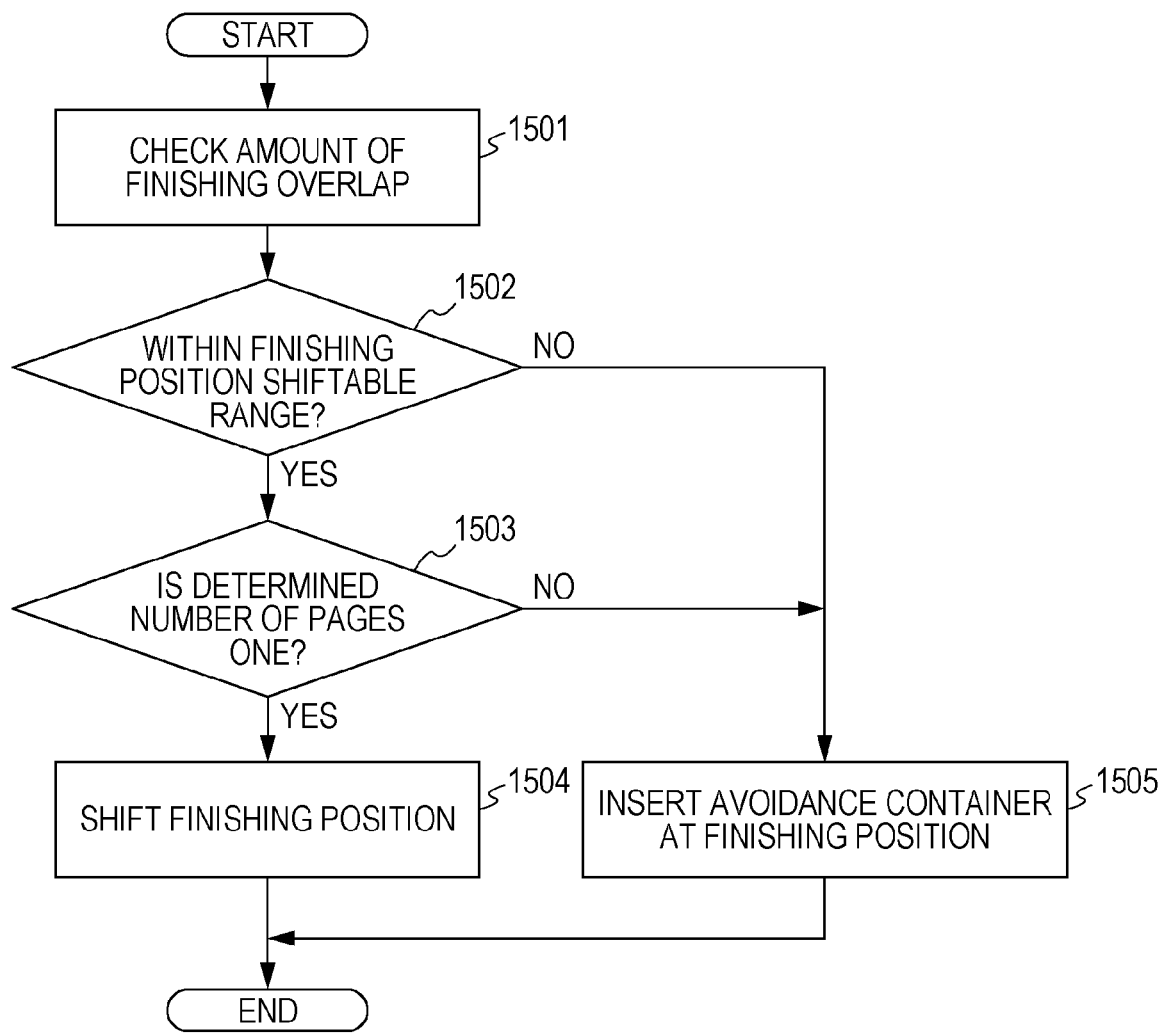
FIG. 11 illustrates a sub-flow in the first embodiment of the present invention.

FIG. 11 is a flowchart explaining the details of step 1411.

Figure 12:
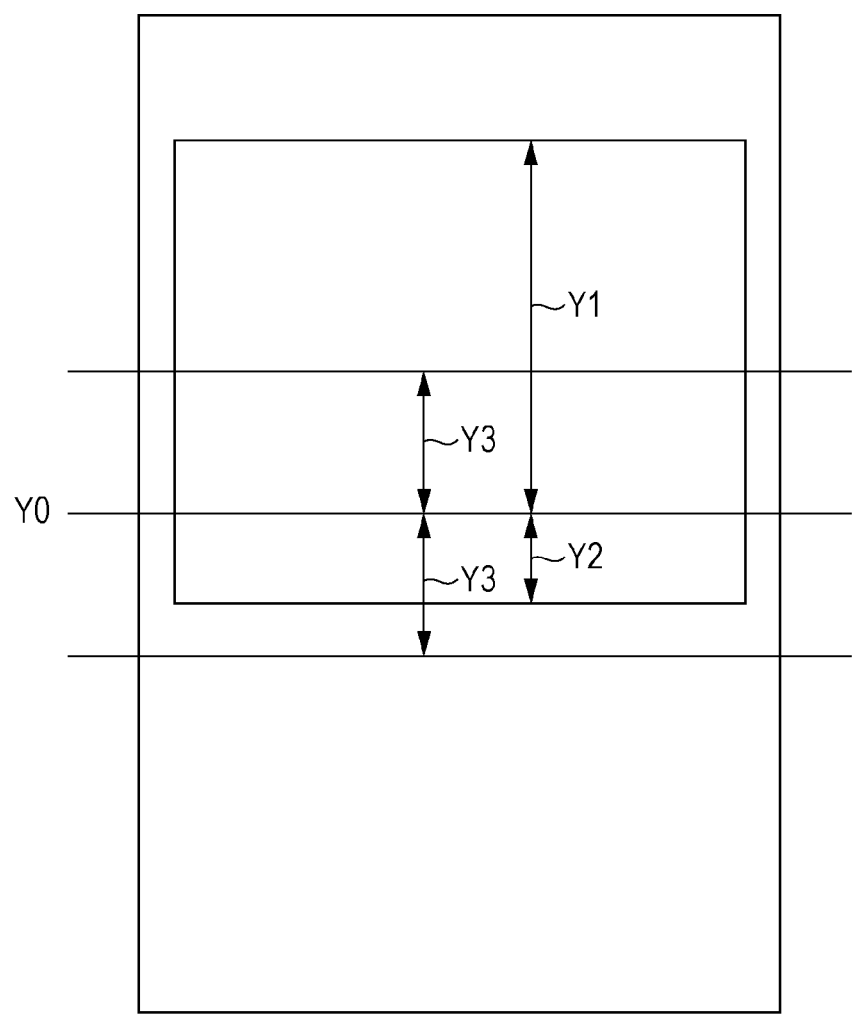
FIG. 12 illustrates examples of the amount of finishing shift in the first embodiment of the present invention.

In step 1501, the layout editing application calculates the amount of shift of the finishing position necessary for solving the overlap between the container and the finishing position. Processing in step 1501 will now be concretely described with reference to FIG. 12. FIG. 12 illustrates the amount of shift by which a position where the finishing process is to be executed is shifted to the outside of a container. A position Y0 indicates the present finishing position where the amount of shift=0. The amount of shift by which the present finishing position should be shifted so as not to overlap with the container is Y1 in the upward direction and Y2 in the downward direction. Referring to FIG. 12, the layout editing application calculates the difference between the coordinates where the present finishing process is to be performed and the coordinates of the upper edge of the container which the finishing position overlaps with, thus obtaining Y1. In addition, the layout editing application calculates the difference between the coordinates where the present finishing process is to be performed and the coordinates of the lower edge of the container which the finishing position overlaps with, thus obtaining Y2. The above-described processings achieve step 1501.

In step 1502, the layout editing application determines whether the amount of finishing shift calculated in step 1501 lies within the range of the amounts of finishing shift of the printer. Specifically, referring to FIG. 12, the range of the amounts of shift of the finishing position is ±Y3 relative to the position Y0. In this case, the layout editing application determines that the finishing position can be shifted because Y2 lies within the range of the amounts of shift of the finishing position.

If it is not determined in step 1502 that the finishing position can be shifted, the process proceeds to step 1505.

In step 1505, the layout editing application inserts an avoidance container (avoidance area) at the finishing position. The avoidance container is used for defining an area where content cannot be printed in order to prevent the content from being printed in the finishing position. The avoidance container may be an area where not only content but also all of data items are not printed. In addition, the layout editing application places the avoidance container without changing the position and size of the container where the avoidance container is placed. For example, FIG. 13 illustrates a case where the size of a container 1702 is not changed before and after an avoidance container 1705 is placed.

Figure 13:
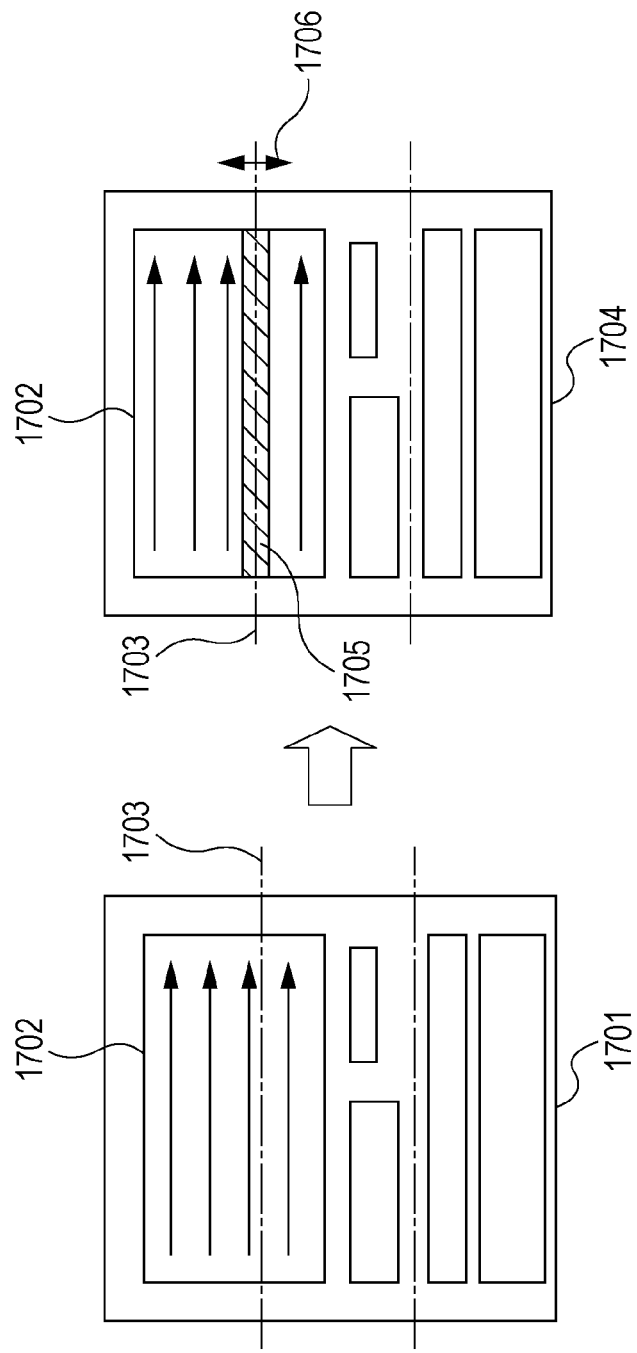
FIG. 13 illustrates a result of placement of an avoidance container in the first embodiment of the present invention.

Referring to FIG. 13, the avoidance container 1705 is inserted because a finishing position 1703 overlaps with the container 1702. Note that when the finishing process is folding, the height 1706 of the size of the avoidance container is determined on the basis of the thickness of a sheet of paper. Since the avoidance container 1705 is inserted as another container different from the container 1702, printing attributes of the container 1702 are not applied to the avoidance container 1705. For example, when it is set that transparent toner is applied to the entire container 1702, a transparent toner attribute is not applied to the avoidance container 1705.

In step 1503, the layout editing application determines the number of pages generated when content is inserted on a template. If the number of pages is one page, the process proceeds to step 1504.

Meanwhile, so long as it is determined in step 1503 that a plurality of pages are generated, if all of the pages have the same amount of finishing shift, the process proceeds to step 1504. If only one page has a different amount of shift, the process proceeds to step 1505.

An advantage according to the first embodiment will now be described using FIG. 13. For example, assuming that transparent toner is applied to the entire container 1702, when a printed material having the result of layout of FIG. 13 is folded at the folding position 1703, the transparent toner may come off. Even if transparent toner is not applied, characters arranged in the folding position may fade. In contrast, in a result of layout 1704 obtained by applying the present embodiment, the avoidance container 1705 is placed in the container 1702. Accordingly, it is possible to avoid the above-described fear, i.e., coming off of transparent toner or fading of characters. Since the above-described problem is solved using the avoidance container, the position and size of the container 1702, serving as an area where content data is placed, are not changed. Advantageously, the result of layout desired by the user can be obtained.

In FIG. 13, horizontal arrows in the container 1702 indicate the arrangement of text data in the horizontal direction.

If content overflows the container 1702 due to the placement of the avoidance container, the layout editing application reduces the size of the content so long as the content is image data. Whereas, when the overflowing content is text data, the layout editing application reduces the font size, character spacing, and line spacing.

[Second Embodiment]

In the first embodiment, content data is prevented from overlapping with a finishing position by inserting an avoidance container. However, inserting the avoidance container may reduce the legibility of characters. A second embodiment will be described with respect to a method of solving this problem.

Figure 19:
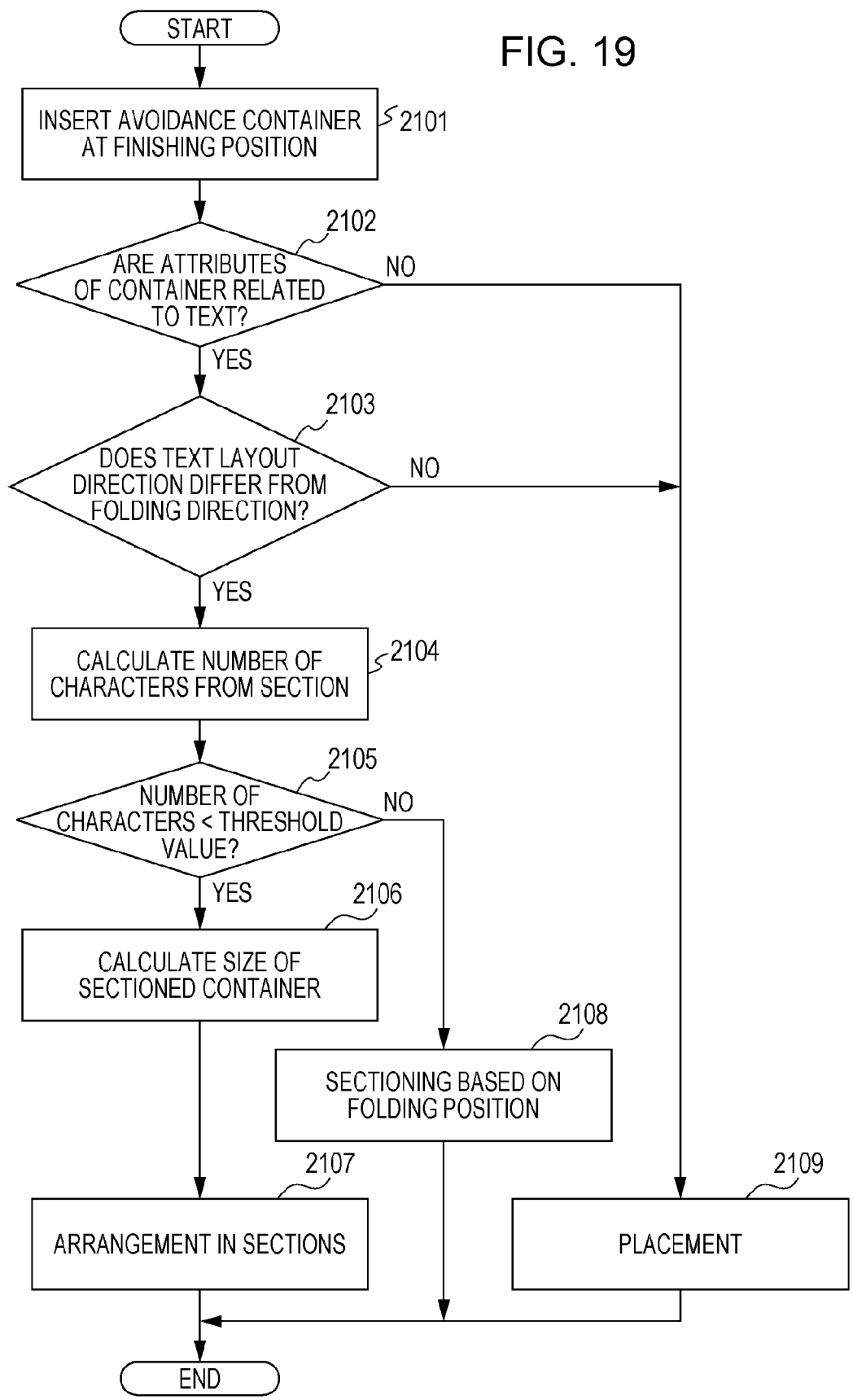
FIG. 19 illustrates a flow according to a second embodiment of the present invention.

The second embodiment will be described using FIG. 19. A process of FIG. 19 is performed upon execution of the above-described processing in step 1505 in FIG. 11.

In step 2101, the layout editing application inserts an avoidance container at a position where a finishing process is to be performed.

In step 2102, the layout editing application determines whether a container into which the avoidance container is to be inserted is a container to which text data is allocated. The determination in step 2101 is achieved by referring to attributes of the container stored in the memory unit 136 through the layout editing application.

When it is determined in step 2102 that text is allocated, in step 2103, the layout editing application compares the direction of text layout and the folding direction. If the text layout direction differs from the finishing direction (folding direction), the process proceeds to step 2104. Whereas, if the text layout direction is identical to the folding direction, the process proceeds to step 2109. The layout editing application performs content placement.

In step 2104, the layout editing application calculates the number of characters which can be arranged in a lower section on the basis of the height of the lower section obtained by sectioning the container at the finishing position and the character size. This processing will now be concretely described using FIG. 20.

Figure 20:
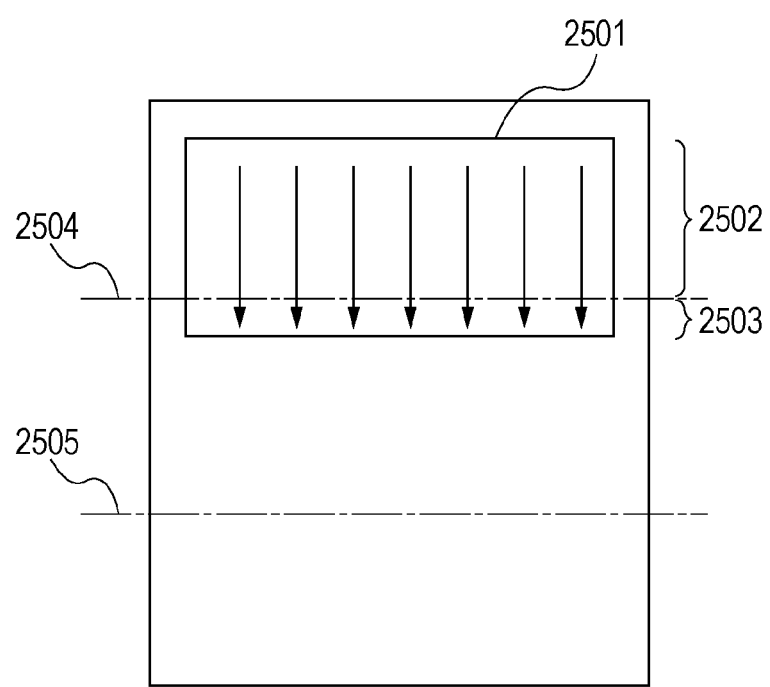
FIG. 20 illustrates the overlap between a container and a finishing position in the second embodiment of the present invention.

FIG. 20 illustrates a result of layout in which a container 2501 overlaps with a finishing position 2504. The container 2501 is divided into an upper section 2502 and a lower section 2503 by a folding process. In this instance, the height of the lower section is divided by the longitudinal length of the character size, thus obtaining the number of characters arranged per column. The number of characters is multiplied by the number of columns, thus obtaining the number of characters arranged in the lower section 2503. For example, assuming that the calculated number of characters which can be arranged per column in the lower section is one character, the layout editing application calculates seven characters because the text is arranged in seven columns in FIG. 20. Since the text layout direction is the vertical direction and a folding line indicating the folding direction is the horizontal direction in FIG. 20, the layout editing application determines in step 2103 that the directions differ from each other.

Figure 21:
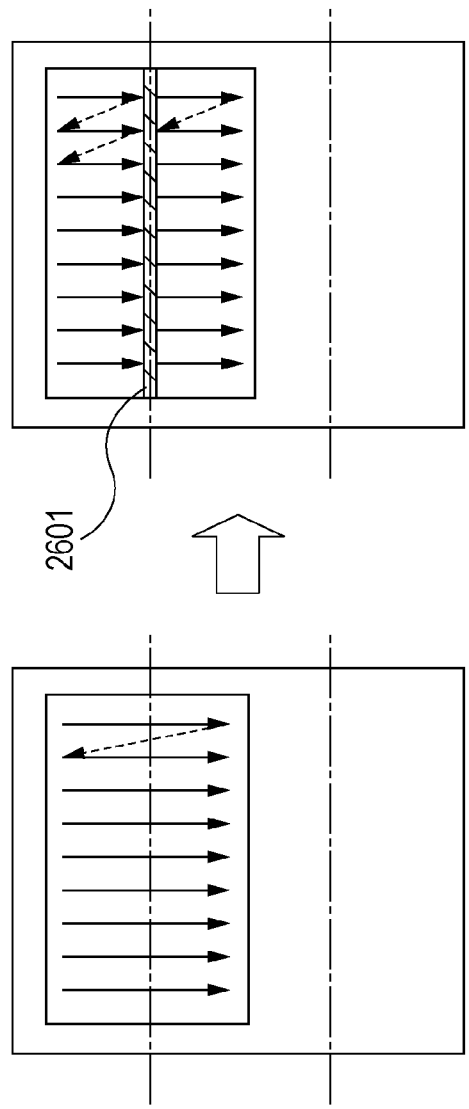
FIG. 21 illustrates a result of changing into sections in the second embodiment of the present invention.

In step 2105, the layout editing application compares the number of characters calculated in step 2104 with the previously defined number of characters (threshold value). If the number of characters calculated in step 2104 is greater than the threshold value, the layout editing application edits the text data so that the text is sectioned at the folding position in step 2108. Thus, a result is obtained as illustrated in FIG. 21.

Whereas, if it is determined in step 2105 that the number of characters is less than the threshold value, the layout editing application allows the process to proceed to step 2106.

In step 2106, the layout editing application calculates the size of a sectioned container changed when the height of the lower section is short. A concrete example of the calculating method will now be described using FIG. 20. In FIG. 20, it is assumed that three-fold is used. The layout editing application divides the product of "the number of characters" calculated in step 2104 and the character size in the longitudinal direction by the height from the folding position 2504 to a folding position 2505, thus calculating the width of the section after change. For example, assuming that the number of characters calculated in step 2104 is seven characters (the character size is 1 cm×1 cm) and the height between the folding positions 2504 and 2505 is 7 cm, a width of 1 cm is calculated. The size of a lower sectioned container is determined as 7 cm (height)×1 cm (width). If a value obtained by dividing the product of the "number of characters" and the character size in the longitudinal direction by the height between the folding positions 2504 and 2505 is not an integer, the value is rounded up to the nearest integer.

Figure 22:
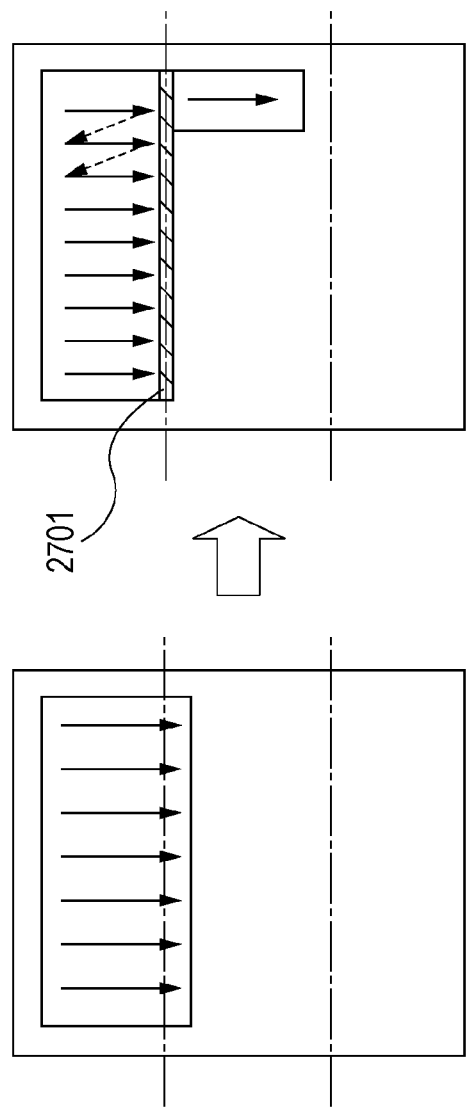
FIG. 22 illustrates a result of changing into sections in the second embodiment of the present invention.

In step 2107, the layout editing application arranges the text data overflowing the upper section in the sectioned container with the size determined in step 2106. FIG. 22 illustrates the result.

As described above, according to the present embodiment, for example, text data is edited in the form of sections with an avoidance container 2601 as the boundary therebetween, as illustrated in FIG. 21. This prevents a reduction in legibility of characters due to insertion of the avoidance container.

In addition, when the number of characters arranged in the lower section is small, the size of the lower section is changed by processing in step 2106. Thus, a result of layout without any reduction in legibility can be output.

In FIGS. 20 to 22, longitudinal arrows in the containers indicate the layout of text data. In FIG. 22, reference numeral 2701 indicates an avoidance container.

[Third Embodiment]

Figure 14:
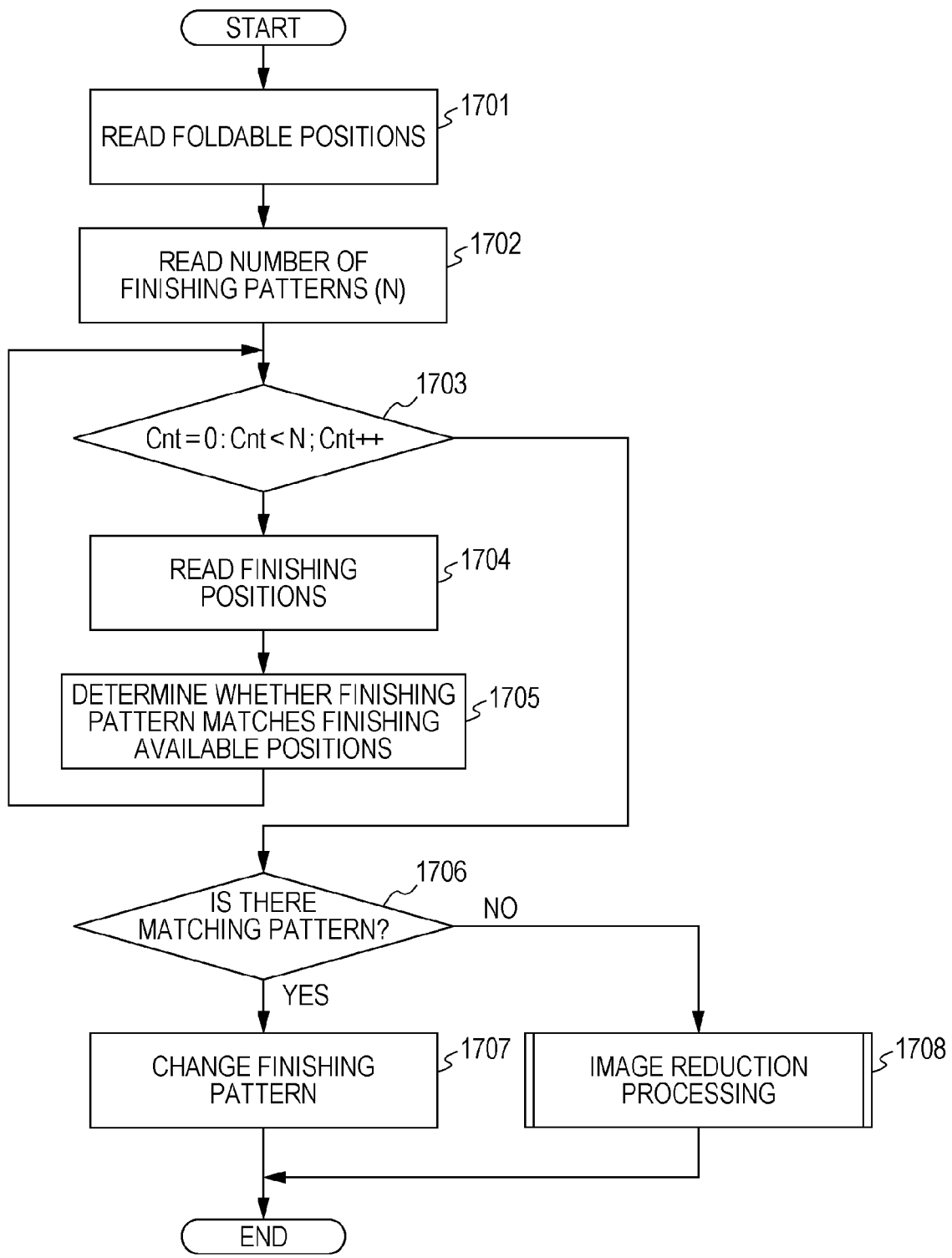
FIG. 14 illustrates a flow according to a third embodiment of the present invention.

In the first embodiment, an avoidance process is performed by inserting an avoidance container. However, content may not fit into a container after insertion of the avoidance container. To solve such a problem, according to a third embodiment, a finishing pattern is changed in the processing in step 1411 in the first embodiment, thus preventing the container from overlapping with a finishing process. FIG. 14 is a flowchart according to the third embodiment.

The third embodiment will be described in detail with respect to the avoidance processing in step 1411 in FIG. 10.

In step 1701, the layout editing application specifies finishing available positions. Specifically, the layout editing application determines that a space surrounding containers correspond to finishing available positions in the result of layout in FIGS. 5 and 6.

Figure 15:
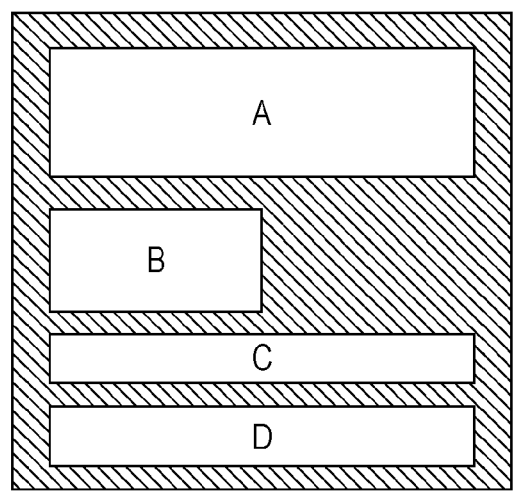
FIG. 15 illustrates finishing available positions in the third embodiment of the present invention.

FIG. 15 illustrates a case where a portion excluding containers is determined as finishing available positions and such an area is indicated by hatching.

In step 1702, the layout editing application reads the number of finishing patterns. In this step, when folding is designated as finishing, the number of folding patterns registered as the abilities of the printer is read. For example, when the registered patterns are "two-fold", "three-fold", and "four-fold", the layout editing application reads "3" as the number of patterns. When stapling is designated, for example, if the printer can perform stapling at "upper left", "lower left", "upper right", and "lower right", the layout editing application reads "4" as the number of patterns.

In step 1703, the layout editing application performs counter processing for repeating processing the number of times equal to the number of patterns read in step 1702.

Figure 16:
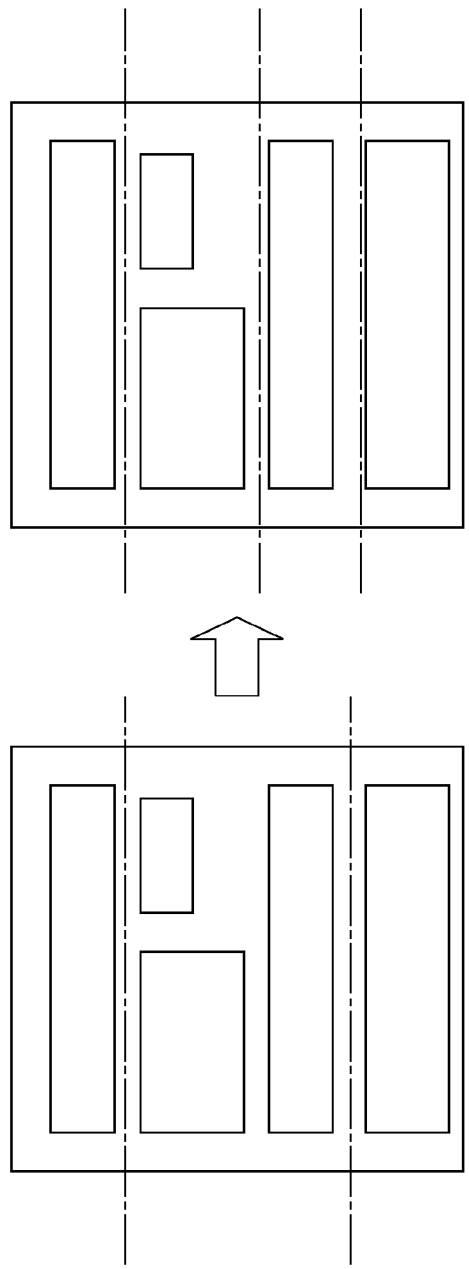
FIG. 16 illustrates a change of a finishing pattern in the third embodiment of the present invention.

In step 1704, the layout editing application reads a finishing position in each finishing process read in step 1701. The finishing position described here is information indicating which position in a sheet of paper folding is performed at. FIG. 16 illustrates an example.

In step 1705, the layout editing application determines whether the finishing position read in step 1704 overlaps with a container and stores the result of determination into the memory unit 136. For example, when positions where "three-fold" is performed are finishing available positions and positions where "four-fold" is performed are not finishing available positions, "three-fold" is stored in step 1705.

When the determination in step 1705 is completed for each of the patterns read in step 1702, the process proceeds to step 1706.

When the layout editing application determines in step 1706 on the basis of the results of determination in step 1705 that there is a finishing pattern matching the finishing available positions, the process proceeds to step 1707.

In step 1707, the layout editing application changes the finishing method so as to provide the finishing pattern matching the finishing available positions in step 1705. When it is determined in step 1705 that a plurality of finishing patterns match the finishing available positions, a finishing process is selected in accordance with a processing mode for, for example, cost priority or performance priority previously set using, for example, the UI in FIG. 9. When cost priority is set using the UI in FIG. 9, for example, a finishing process with the largest number of folding times is selected so that content can be transmitted using a small envelope. Whereas, if performance priority is set, a finishing process with the smallest number of folding times is selected.

Figure 17:
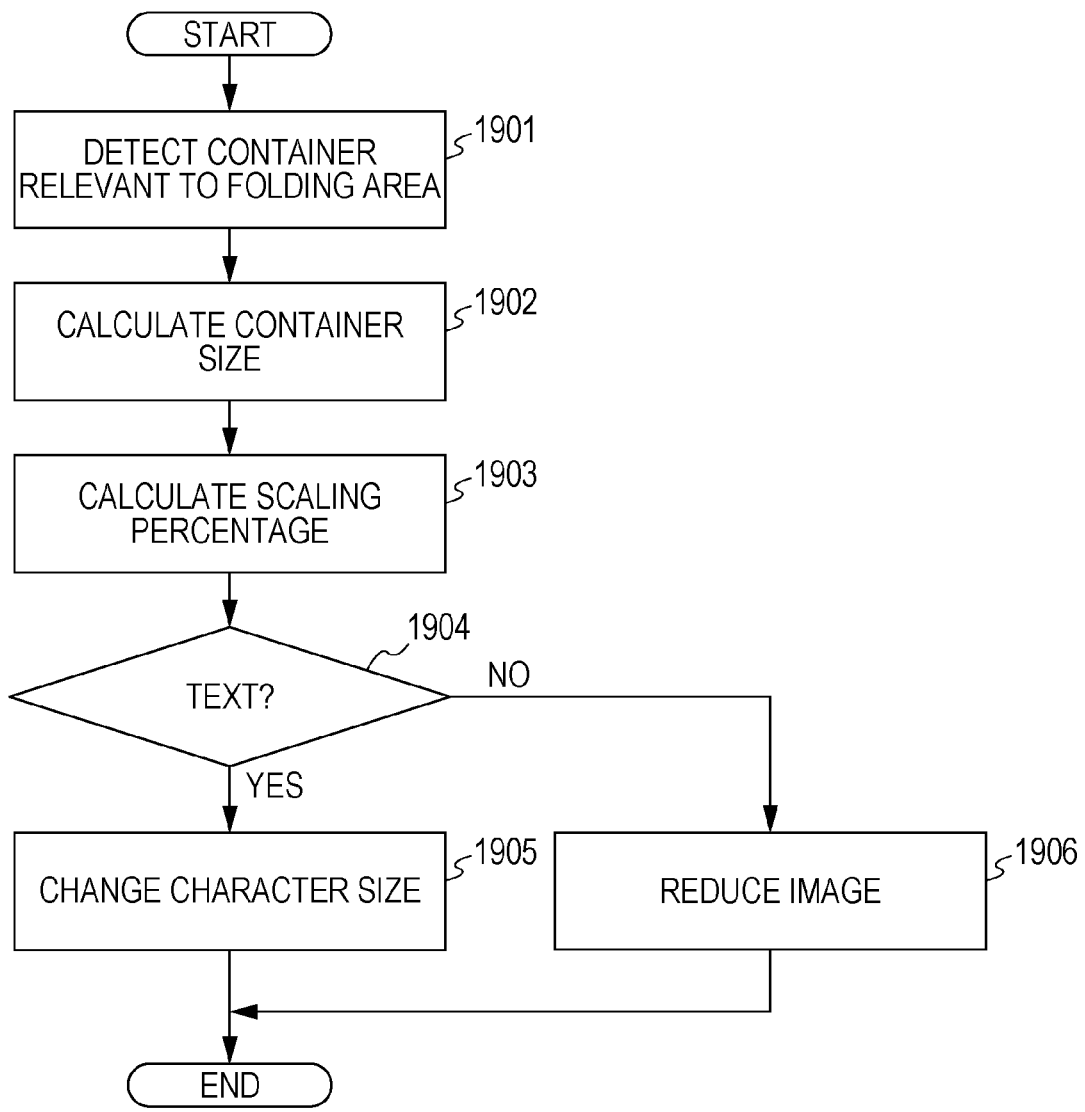
FIG. 17 illustrates a flowchart for determining whether to change the size of a container in the third embodiment of the present invention.

Step 1708 is processing performed when a matching pattern is not found and will be described in detail using FIG. 17.

In step 1901, the layout editing application detects a container relevant to a finishing area. In step 1902, the layout editing application calculates the size of a container for preventing the container relevant to the finishing area from being subjected to finishing.

Figure 18A:
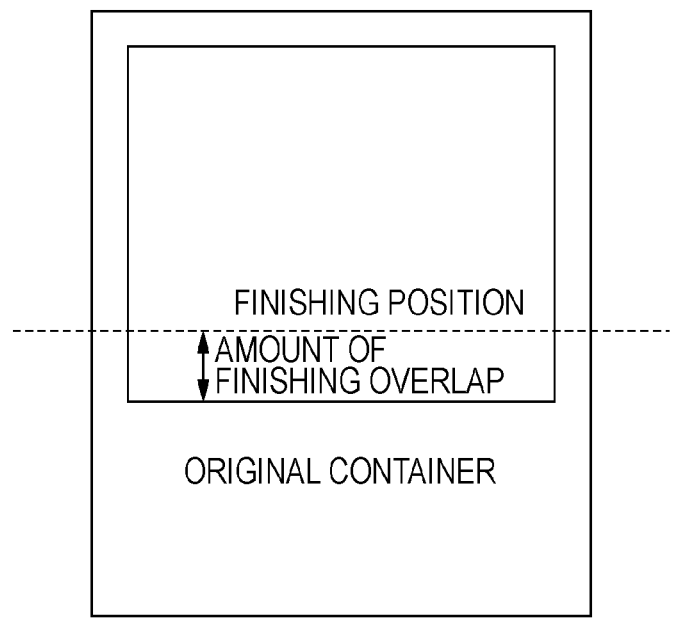
FIGS. 18A and 18B illustrate examples of the overlap between a container and a finishing position in the third embodiment of the present invention.
Figure 18B:
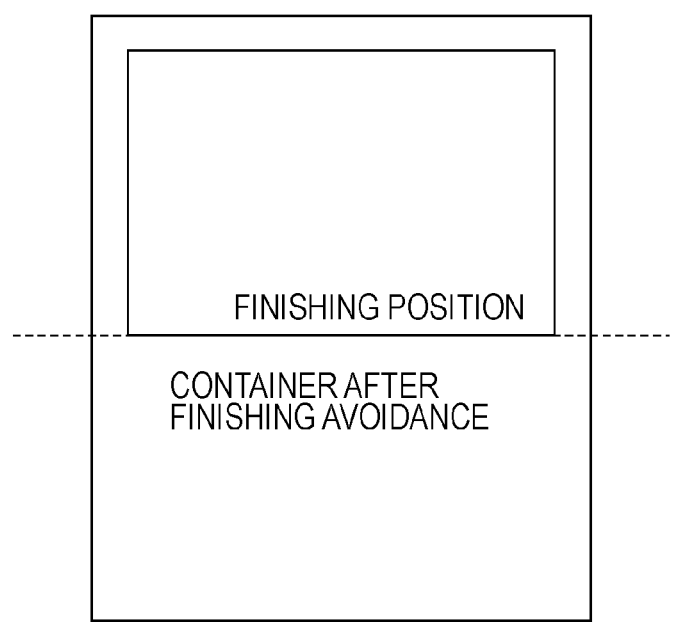

FIG. 18A illustrates a case where finishing overlaps with an original container. FIG. 18B illustrates a result of change in the size of the container by an amount of finishing overlap so that finishing does not overlap with the original container.

In step 1903, the layout editing application calculates the ratio of the size of a finishing avoidance container to the size of the original container as the percentage of scaling in container size.

In step 1904, the layout editing application determines the kind of content in the container. If the kind of content is text, the layout editing application proceeds to step 1905 and changes the character size on the basis of the scaling percentage calculated in step 1903. Whereas, in step 1906, the layout editing application enlarges or reduces the size of an image.

If the scaling percentage is too high, a document may not have an appropriate configuration in some cases. According to a method, therefore, an upper limit of the scaling percentage is predetermined and the process is not performed when the percentage exceeds the upper limit. The present invention is effective in this method.

The present invention is achieved by performing the following process. Specifically, the process includes supplying software (program) for implementing the functions of the above-described embodiments to a system or apparatus through a network or various storage media and allowing a computer (a CPU, an MPU, or the like) of the system or apparatus to read out and execute the program. In this case, aspects of the present invention include the program and a storage medium storing the program.

The overlap between a finishing position and content can be avoided and a desired printed material can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Reference Signs List 101 computer
132 key board
133 mouse

The invention claimed is:

1. An information processing apparatus comprising:
a setting unit configured to set a finishing process used for a sheet of paper;
an obtainment unit configured to obtain function information indicating a finishing position where the finishing process is to be executed and an adjusting range of the finishing position;
a first determination unit configured to determine based on the function information whether the finishing position where the finishing process is to be executed overlaps with a content data placement area; and
a specification unit configured to specify an amount of shift of the finishing position to avoid overlap, when the first determination unit determines that the position where the finishing process is to be executed overlaps with the content data placement area;
a second determination unit configured to determine whether or not the specified amount of shift is within the adjusting range;
a placement unit configured to place, an avoidance area where printing is not performed at an overlap position where the finishing position overlaps with the content data placement area in a case where the specified amount of shift is determined not to be within the adjusting range, and to shift the finishing position according to the specified amount of shift in a case where the specified amount of shift is determined to be within the adjusting range.

2. The apparatus according to claim 1, further comprising:
a reducing unit configured to, when the placement of the avoidance area in the content data placement area by the placement unit allows content data to be placed in the content data placement area to overflow the content data placement area, reduce the size of the content data so that the content data fits into the content data placement area.

3. The apparatus according to claim 1, further comprising:
an edition unit configured to, when the finishing process is a folding process of folding a sheet of paper printed along a folding line in the horizontal direction and text data is placed in the vertical direction in the content data placement area, edit the text data in a form of sections with the avoidance area placed by the placement unit being set as a boundary between the sections.

4. The apparatus according to claim 3, further comprising:
a change unit configured to, when the number of characters of the text data placed in a lower section, included in the content data placement area, created by sectioning the content data placement area along the folding line in the horizontal direction is less than a threshold value, changing the lower section.

5. A control method comprising:
a setting step of setting a finishing process used for a sheet of paper;
an obtaining step of obtaining function information indicating a finishing position where the finishing process is to be executed and an adjusting range of the finishing position;
a first determining step of determining based on the function information whether the finishing position where the finishing process set in the setting step is to be executed overlaps with a content data placement area; and
a specifying step of specifying an amount of shift of the finishing position to avoid overlap, when it is determined in the first determining step that the position where the finishing process is to be executed overlaps with the content data placement area;
a second determining step of determining whether or not the specified amount of shift is within the adjusting range;
a placing step of placing an avoidance area where printing is not performed at an overlap position where the finishing position overlaps with the content data placement area in a case where the specified amount of shift is determined not to be within the adjusting range, and to shift the finishing position according to the specified amount of shift in a case where the specified amount of shift is determined to be within the adjusting range.

6. A non-transitory storage medium storing a program that is readable by a computer and allows the computer to execute:
a setting step of setting a finishing process used for a sheet of paper;
an obtaining step of obtaining function information indicating a finishing position where the finishing process is to be executed and an adjusting range of the finishing position;
a first determining step of determining based on the function information whether the finishing position where the finishing process set in the setting step is to be executed overlaps with a content data placement area; and
a specifying step of specifying an amount of shift of the finishing position to avoid overlap, when it is determined in the first determining step that the position where the finishing process is to be executed overlaps with the content data placement area;
a second determining step of determining whether or not the specified amount of shift is within the adjusting range;
a placing step of placing an avoidance area where printing is not performed at an overlap position where the finishing position overlaps with the content data placement area in a case where the specified amount of shift is determined not to be within the adjusting range, and to shift the finishing position according to the specified amount of shift in a case where the specified amount of shift is determined to be within the adjusting range.

* * * * *